Patented Jan. 20, 1925.

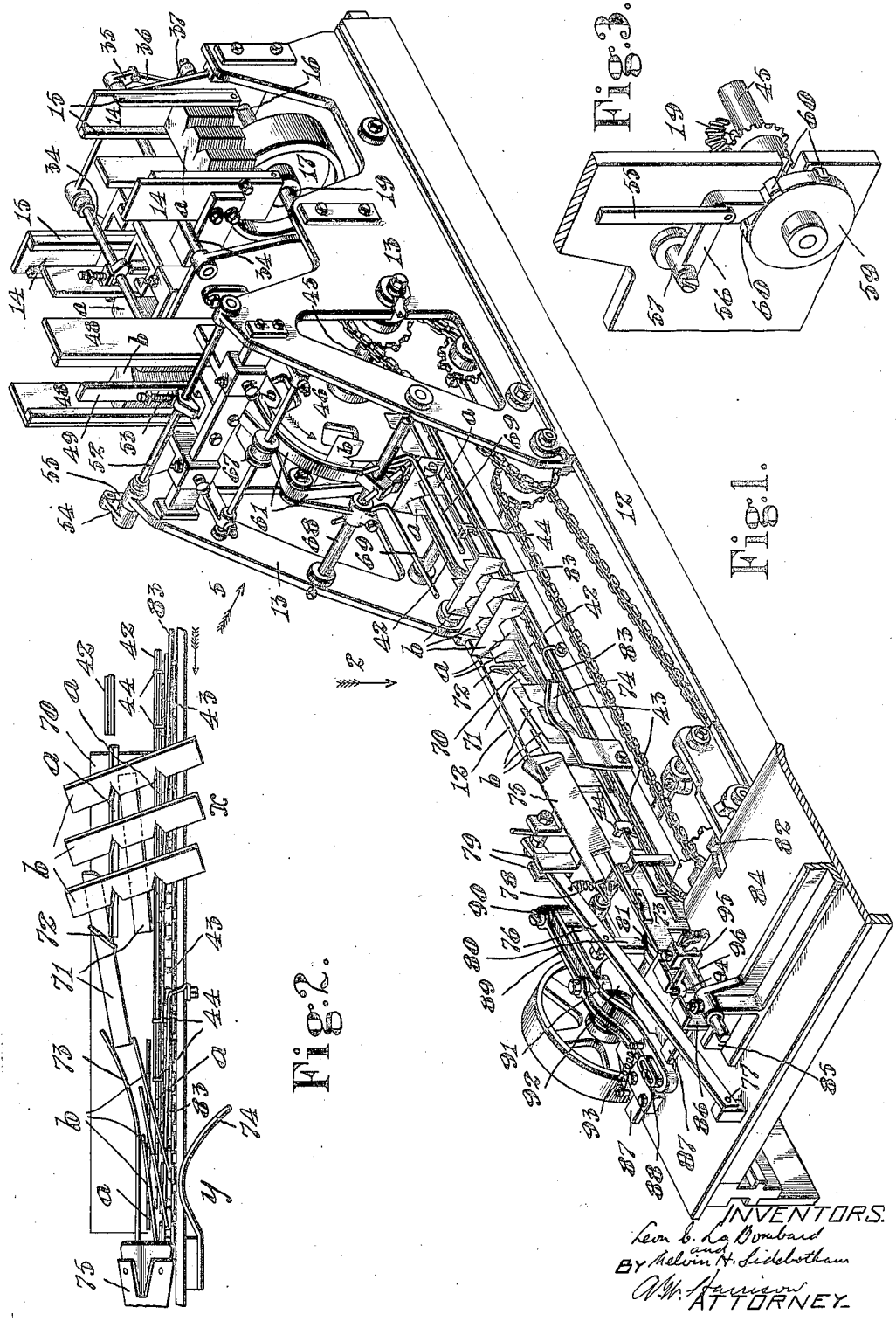

1,523,652

UNITED STATES PATENT OFFICE.

LEON E. LA BOMBARD AND MELVIN H. SIDEBOTHAM, OF CHELSEA, MASSACHUSETTS, ASSIGNORS TO SPECIALTY AUTOMATIC MACHINE COMPANY, OF CHELSEA, MASSACHUSETTS, A CORPORATION OF MASSACHUSETTS.

STRIP-ASSEMBLING MACHINE.

Application filed May 8, 1922. Serial No. 559,145.

*To all whom it may concern:*

Be it known that we, LEON E. LA BOMBARD and MELVIN H. SIDEBOTHAM, citizens of the United States, and residents of Chelsea, in the county of Suffolk and State of Massachusetts, have invented certain new and useful Improvements in Strip-Assembling Machines, of which the following is a specification.

This invention relates to the production of assembled units of strip material, one set of strips crossing the strips of another set. A particular use for machines such as illustrated herein is the manufacture of collapsed partitioning capable of being opened or spread out and fitted in boxes to form cells for the reception of articles such as eggs. The machine illustrated is intended to make partitioning of the kind described and claimed in our application filed July 2, 1921, Serial No. 482033.

Box partitioning of this general type comprises two sets of strips crossing each other and interengaged, the strips being made of cheap paper box material. The strips employed vary in number according to the number of cells to be provided, and the relative lengths of the two sets of strips vary according to the relative length and width of the box which is to receive the partitioning. In the illustrated embodiment of the present invention the machine is shown as assembling five strips three of which cross the other two, but we do not limit ourselves to the production of assembled units having the specific relative proportions as shown.

One of the objects of the invention is to provide a machine which will assemble and interengage previously cut strips. One advantage obtained is that the strips can be made from pieces of material such as those resulting from cutting various forms of box blanks and which have been regarded as waste. No such economy of material is possible with machines which take their supply from rolls or coils of strip material.

Another object is to provide a machine which will rapidly and automatically select a predetermined number of strips from one source of supply and assemble them with, and interengage them with, another set of strips.

Another object is to provide a machine of the type explained which will discharge or deliver the assembled units in flat or collapsed condition ready for shipment or storage.

With these and other objects in view, the invention consists in the construction and combination of parts substantially as hereinafter described and claimed.

Of the accompanying drawings:

Figure 1 is a perspective view of the entire machine, some parts being broken away either because unnecessary to illustrate or to more clearly show other parts.

Figure 2 is a plan view of that portion of the machine below the arrow 2 in Figure 1.

Figure 3 is a detail perspective view of one of the blank-feed-controlling cam mechanisms.

Similar reference characters indicate similar parts in all of the views.

A brief preliminary explanation of the machine as a whole will facilitate an understanding of its details.

Figures 6, 7:
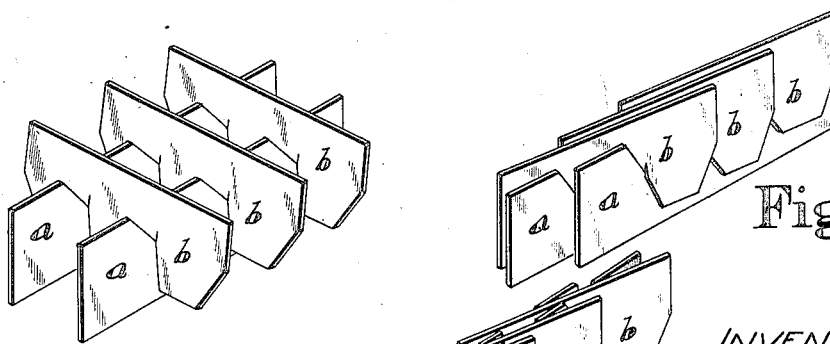
Figures 6, 7 and 8 are perspective views of assemblies of blanks in their conditions at three points of operation of the machine.

Two notched strips $a\ a$ are simultaneously fed from two supply hoppers 14, 14 and are deposited or dropped, with their notched edges up, into two channels 42 which guide them while they are fed or pushed along by lugs 44 of chains 43. While these two strips are moving along side by side as indicated in Figure 1, their notches successively receive three strips $b\ b\ b$ which are fed, in close succession, notched edges down, from the single supply hopper 48. By assembling the strips in this manner, while all of them are in vertical or up-standing relationship, a high speed of production is secured because they are in relative positions such as indicated in Figure 6 ready for the further automatic treatment presently described in connection with Figures 7 and 8. Said strips $b\ b\ b$ are fed and delivered by the large disk or wheel 46 with the aid of a cooperating belt 61, and their notches and the notches of the strips $a\ a$ are wide enough to cause the strips b b b to descend automatically to position to rest with the apexes of the notches of the two sets of strips just meeting (Fig. 6). At this time the strips b b b usually rest somewhat tilting, held by the inclined edges of the notches of strips a a.

Figure 8:

In line with the apex of each notch is a short slit and ultimately the strips are pushed together to cause said short slits to slip past each other to frictionally interengage the two sets of strips (Fig. 8). This pushing together can not be readily effected while the strips cross each other at a right angle, because the material of the strips is not sufficiently stiff. Therefore, as the chain lugs continue to push the lower strips along carrying the upper cross strips with them, one lower strip is caused to travel for a short distance at a different speed from the other and at the same time the two lower strips approach each other and swing the upper strips around until they all occupy about the relative positions indicated in Figure 7 and above the y in Figure 2. This brings all the strips of both sets into such close and almost parallel relationship that they brace or steady each other as they pass under the pressure of hammer 75 (Fig. 1). At this point and while the strips are in relative positions indicated in Figure 7, the strips b b b are struck a sharp blow by the hammer 75 so that they are all forced down to bring the upper and lower edges of the strips of both sets into parallelism (Fig. 8). During all of this time the strips are moving (in practice at a speed producing approximately 90 or 100 assemblages a minute), and after the operation of the hammer they reach a stop, and each assemblage or flattened group is shifted by a pusher 86 onto a table 84 under a catch 94, ready to be picked up flat and packed.

The specific structure of the machine illustrated will now be explained.

The side members 12 of the frame (having suitable legs not necessary to illustrate) support uprights or brackets for three feed mechanisms. Two of such brackets are indicated at 13.

Supported by the frame and its brackets are two hoppers 14 (Figs. 1 and 4) for two piles of blanks a. It is to be noted here that in Figure 4, the hopper 14 at the left and the mechanism for controlling the feed therefrom is shown in elevation while at the right in said Figure 2 a line of section is selected to cut through the interior of the other hopper 14 in a vertical plane at one side of the feed wheel.

Figure 4:
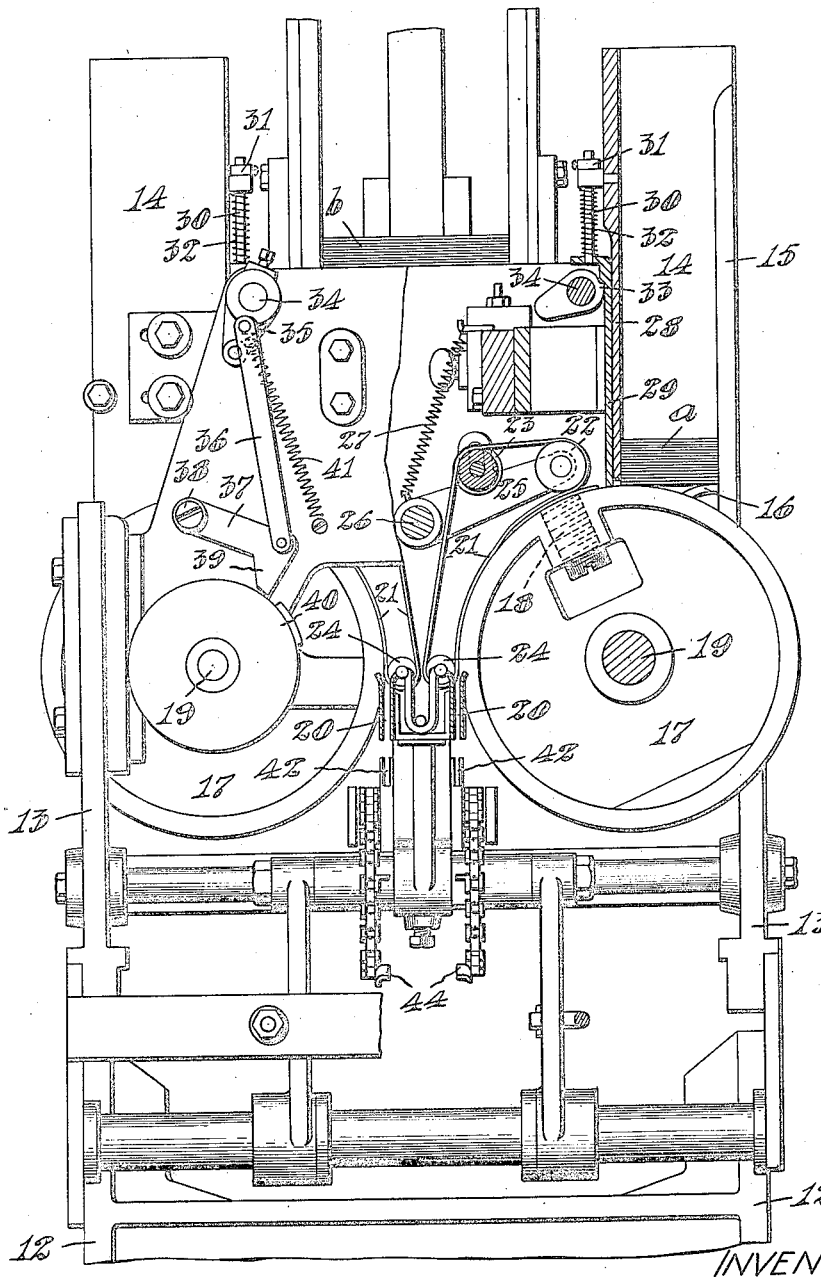
Figure 4 represents a view from the right of Figure 1 partly in elevation and partly in vertical section.

The back of each hopper is open while the end walls are formed or provided with vertical strips 15 to guide the corners of the blanks. The rear corners of the bottom blank of each pile rests on lugs 16 and the front edge thereof, at or near its middle, rests on a feed wheel 17 having a peripheral friction pad or plug 18. Two wheels 17 are carried by shafts 19 and are driven in the direction of the arrows (Fig. 4).

As best shown at the right in Figure 4, each bottom blank a fed out from its hopper is retained in contact with the periphery of the wheel until it reaches a guide or flat funnel 20 the mouth of which is tangential to the wheel and through which it passes into a channel hereinafter described, said two channels extending nearly the full length of the machine for a purpose explained hereinafter. To cause each blank to move and be dropped into its proper guide and channel, a belt 21 is mounted on three pulleys 22, 23, 24, so arranged relatively to each other and to the wheel 17 that a portion of the belt snugly fits a portion of the periphery of the wheel, the lower pulley 24 being so positioned as to release each blank at a proper point to discharge that blank into the guide 20. The three pulleys may be idle or one may be driven to ensure travel of the belt at the same speed as the periphery of the wheel. Preferably the pulleys 22, 23, are carried by an arm 25 pivoted at 26 and having a spring 27 connected to it to cause the belt to bear yieldingly on the wheel. The pulley 23 is mounted adjustably on the arm to enable it to be utilized as a belt tightener when desired.

To render it certain that only one blank at a time will be removed from the bottom of each hopper 14, we employ mechanism similar to that embodied in our application filed June 24, 1922, Serial No. 570,697. This mechanism in the present instance comprises a vertical bar 28 the lower end of which is at such height above the path of the revolving friction plug 18 as to just permit the passage of a single blank. Mounted to slide in a suitable vertical guideway of the bar 28 is a gate strip 29 the lower end of which, when said strip is not lifted, extends below the tip of the bar 28 to obstruct passage of a blank. Secured to and rising from a lateral ear of the gate strip 29 is a pin 30 guided in a fixed lug 31. A spring 32 coiled around the pin 30 and confined between the lug 31 and the ear of the gate strip acts lightly to tend to hold the gate strip in its lower, closing, position. Said gate strip is lifted intermittently at the proper times to open the passageway, by a short arm or tip 33 of a rock shaft 34. An arm 35 of said rock shaft (referring now to the portion shown in elevation at the left, Figure 4) is connected by a link 36 with an arm 37 pivoted at a fixed point 38 and having a toe 39 bearing on a cam disk 40 carried by shaft 19. A spring 41 actuates the rock shaft in the direction opposite to that effected by the cam.

The mechanism for feeding blanks from the two hoppers 14 are duplicates and they are so timed in operation that both gate strips are lifted practically simultaneously and the instant before the friction plugs of the two feed wheels begin to deliver blanks. The cam of each disk 40 is so short that it passes the arm tip 39 before the blank has completely passed the gate strip. Consequently each gate strip is lowered by its spring 32 and bears on the rear surface of the out-going blank and the instant that the blank has passed entirely out, the gate strip descends onto the smooth periphery of the wheel and prevents the passage of a second blank. The timing is such that two single blanks *a a* are delivered through the guides or funnels 20 and drop side by side into two parallel channels 42 one of which is longer than the other as shown in Figures 1 and 2, the notched edges of the two blanks being uppermost.

The channels 42 are suitably supported by the frame of the machine and are of a depth somewhat less than half the vertical width of the blanks *a,* so that said blanks will project well above the tops of the channels. Chains 43 having pushing lugs 44 at spaced intervals are mounted on driven sprockets to cause the upper stretches of said chains to travel parallel with and close to the outer sides of the tops of the channels with the lugs extending laterally from the chains across the tops of the channels. The chain at the side of the short channel (the one at the right if looking in the direction of travel of the pushed blanks *a*) has single lugs at spaced intervals while the other, longer, left-hand chain has twice as many lugs which are arranged in slightly spaced pairs for a reason presently explained. These will be referred to as the front and rear lugs of the pairs.

Immediately after the blanks *a a* are fed into the two channels the rear end of one is engaged by a lug of the right hand chain and the rear end of the other blank is simultaneously engaged by the front lug of one of the pairs of the left hand chain, and the two blanks are pushed along the channels side by side.

The machine illustrated is supposed to be operating on blanks *a* each of which has three edge notches. We will now describe the mechanism for depositing a group of three blanks *b* crosswise of the blanks *a*

Figure 5:
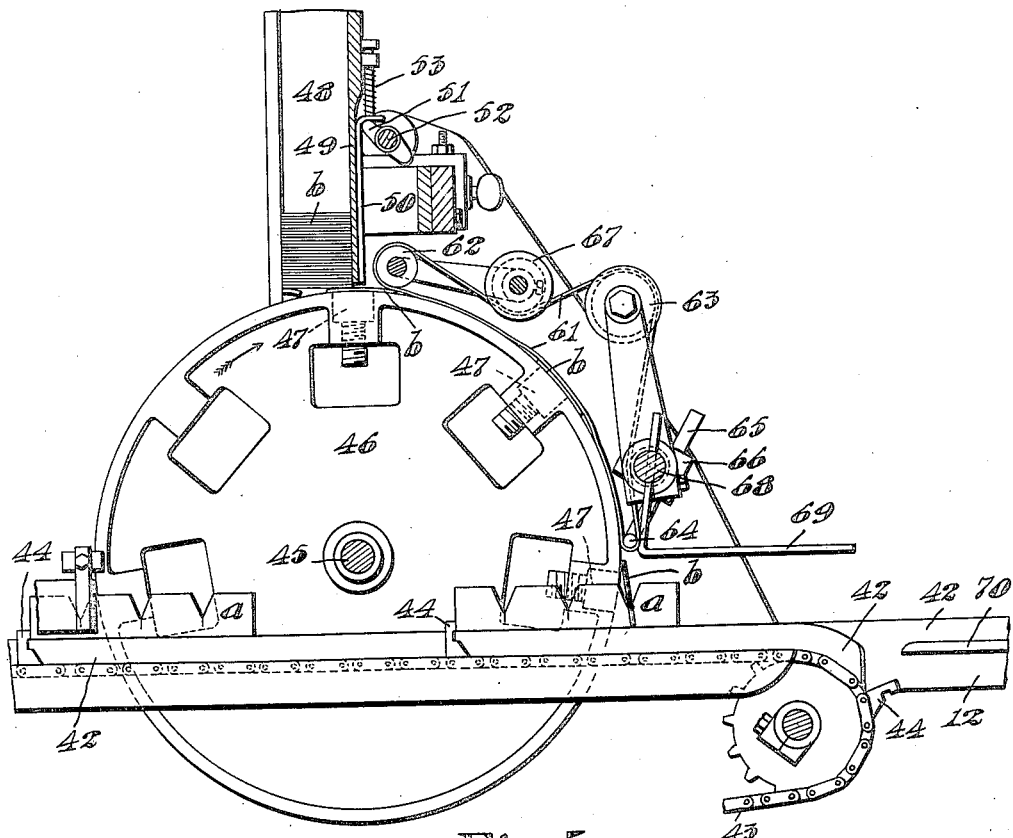
Figure 5 is a sectional elevation of the plural feed mechanism looking in the direction of the arrow 5 in Figure 1.

As shown in Figures 1 and 5, a shaft 45 carries a feed wheel 46 narrow enough to project through the space between the two channels 42. Said wheel has three peripheral friction plugs 47. As indicated in Figure 5 the wheel has accommodation for five friction plugs in case cell partitioning is to be made of longer blanks *a* and with five crossing blanks *b.*

Above the wheel 46 is a hopper 48 for the blanks *b.* The mechanism for controlling the issuance of the blanks from the hopper 48 is similar to that illustrated and described in connection with the two hoppers 14 except that from the hopper 48 three blanks *b* are to issue in rapid succession while a pair of blanks *a a* are passing by said three blanks to be deposited, notched edges down, in and crossing the up-turned notches of the blanks *a a.*

The hopper 48 has a vertical bar 49 similar to the bar 28 of hopper 14 and has a vertically movable gate strip 50 which is lifted by an arm 51 of a rock shaft 52, against the closing pressure of a spring 53. Said rock shaft has, at one end, another arm 54 (Figs. 1 and 3) connected by a link 55 with an arm 56 pivoted at 57 and having a toe 58 bearing on a disk 59 carried by shaft 45, said disk having three cam projections 60. If more than three blanks *b* are to be fed during one revolution of the shaft and feed wheel, a proper cam disk may be substituted for the one illustrated in Figure 3.

The cams 60 are so spaced relatively to the friction plugs 47 of the feed wheel as to effect three successive openings of the gate strip 50 just as the three friction plugs arrive, one after another, in position to eject three blanks *b b b* as illustrated in Figure 5. The notches of the passing blanks *a a* arrive in position to receive the three blanks *b b b* successively. As shown in Figure 1, the blanks *b* are so placed in the hopper 48 that their notched edges will interengage the notched edges of the blanks *a.*

To cause the blanks *b* to travel in contact with the feed wheel until ready to engage the blanks *a*, we employ a belt 61 (similar in operation to the belts 21 before described) said belt being mounted on pulleys 62, 63, and a rod or small pulley 64 the latter being carried by a rod 65 adjustable in a fixed block or holder 66. A pulley 67 intermediate the pulleys 62, 63, serves in cooperation with the latter to keep the belt taut.

In operation the speed of rotation of the wheel 46 and the corresponding travel of the portion of the belt which contacts therewith are such that each blank *b* is practically thrown down into contact with the blanks *a* crosswise thereof, the apexes of the notches of each blank *b* coming to rest on the apexes of the notches of the two blanks *a* (Fig. 6).

The block or holder 66 is supported by a fixed transverse rod 68 which also supports two fingers 69 extending in a direction to render it impossible for any of the blanks to rise above their proper plane of travel.

The simple assembling of the blanks occurs as illustrated in Figure 5 and in that portion of Figure 1 which includes the plural feed wheel 46. Then, as the chains continue to push the assemblage along, the right hand blank $a$ reaches a flat shelf 70 (Figs. 2 and 5) and is no longer pushed by a lug of the short chain. The forward lug of the longer chain however continues to push the left hand blank $a$ along, and the lower edge of the right hand blank $a$ passes into a guideway formed between two laterally inclined strips 71. As the right hand blank $a$ is delivered onto the shelf 70 there is a tendency to slightly accelerate its movement owing to the lug which pushed it moving down around the sprocket which carries the end of the short chain (see Figure 5). This results in the assemblage reaching the shelf 70 with its blanks in about the relative angular arrangement shown above the $x$ in Figure 2. Then, as the assemblage or group is pushed along by the action of a lug of the longer or left hand chain, the friction between the lower edge of the right hand blank $a$ tends to retard that blank. A pin 72 extends into the path of that blank. Said friction, and the pin 72, cause the right hand blank to be retarded so that the continued positive advance of the left hand blank results in the cross blanks $b$ swinging back so that, as the movement continues, the entire group collapses laterally, the right hand blank $a$ passing the pin 72 and being then guided by the outer strip 71 so that the assemblage progresses toward the position indicated above the $y$ in Figure 2. At this time the assemblage has arrived between two curved wall strips 73, 74, which ensure the guiding of the five assembled blanks to position to be acted upon by the presser or hammer 75 which imparts a blow of sufficient force on the upper edges of the three blanks $b$ $b$ $b$ to force those blanks down to the same plane as the blanks $a$ $a$ (Fig. 8). The slits at the bottom of the notches of all the blanks permits this movement, and the blow of the hammer ensures the interengagement of said slits as explained in our application Serial No. 482033.

The hammer 75 is carried by a lever 76 pivoted at 77. A spring 78 actuates the hammer lever in a downward direction, said lever operating in a suitable fixed guide 79. The lever has a fixed foot piece 80 which rides on a cam 81 carried by the drive shaft 82 of the machine said cam being formed to lift the hammer lever and then permit it to be thrown down quickly by the spring 78. The timing is such that the hammer acts on each laterally collapsed assemblage passing under it.

One or more slender yieldingly mounted rods 83 may be employed to bear against the sides of the passing lugs of the left hand chain to guide said lugs so that they will always ride along, crossing the tops of the channels.

In Figure 2 the assemblage above the letter $y$ is shown as nearly collapsed. Upon further collapsing, just before arriving under the hammer, the rear end of the right hand blank $a$ swings in front of the rear lug of the pair 44 so that thereafter both blanks $a$ $a$ are pushed along.

The pushing action of the pair of lugs 44 of the long chain continues and delivers the assemblage on a table 84 in the condition indicated by Figure 7, said assemblage being arrested by a stop 85 in front of a pusher 86 which, at this time, is in position to receive the assembled collapsed group of blanks in front of it.

The pusher operates in a direction at a right angle to the direction of movement of the blanks when they arrive against the stop 85, said pusher being carried by a slide 87 having a pin 88 which engages a slot in a lever 89 pivoted at 90 and having a roll 91 acted upon by a side face cam 92 carried by the shaft 82. A spring 93 returns the lever.

The pusher shifts each assemblage under a catch 94 pivoted to a block 95 carried by a pin 96 mounted in the bracket portion of the stop 85, said catch having a spring to normally hold it so that, after an assemblage has been pushed past it on and along the table, it will prevent return of that or any assemblage into the path of another assemblage that is to be delivered on the table. The pusher, after shifting an assemblage past the catch, returns quickly to its normal position out of the way of the next assemblage to arrive in front of it.

The operation of the machine having been preliminarily explained, and the operation and function of the individual parts having been explained in connection with the description of their structures, further reference to the operation will be unnecessary.

Having now described our invention, we claim:

1. A machine of the character described having a plurality of supply hoppers for strips of material, an independent feeder for removing strips singly from each of said hoppers, and means for assembling the fed strips in crosswise relationship.

2. A machine of the character described having a plurality of hoppers for previously cut strips of material, an independent feeder for removing strips singly from each of said hoppers, means for causing the strips to travel in up-standing positions, and means for assembling the strips in crosswise relationship while travelling.

3. A machine of the character described having a plurality of hoppers for previously cut strips of material, an independent feeder for removing strips singly from each of said hoppers, means for causing the strips to travel in up-standing positions, and means for assembling the strips in crosswise relationship while travelling, said machine being characterized by imparting continuous uninterrupted movement to the strips from their feeding points to the point of assemblage.

4. A machine of the character described having a plurality of hoppers for previously cut strips of material, means for feeding strips from said hoppers, means for assembling the fed strips in crosswise relationship, and means for laterally collapsing the assemblage.

5. A machine of the character described having a plurality of hoppers and feeders for notched strips of material, means for assembling a plurality of said strips crosswise of each other, and means for imparting edgewise pressure on the strips after they are crossed.

6. A machine of the character described having carriers for a plurality of notched strips, a plurality of hoppers and feeders for supplying strips to said carriers and for supplying a plurality of other strips to positions crossing the first mentioned strips, and means for pressing the two sets of strips into close relationship.

7. A machine for assembling two sets of previously cut strips formed with edge notches and having slits communicating with the notches, said machine having means for supporting the strips of one set upright with their notches uppermost, strip feeding mechanism for said set, independent hoppers and feeding means for supplying the strips of the other set crosswise on the first set with the notches of the two sets interengaging, and means for pressing the strips to cause their slotted portions to interengage.

8. A machine for assembling two sets of strips formed with edge notches and having slits communicating with the notches, said machine having means for supporting the strips of one set upright with their notches uppermost, means for depositing the strips of the other set crosswise on the first set with the notches of the two sets interengaging, means for collapsing the strips to flatwise relationship, and means for exerting edgewise pressure on the strips to cause their slits to move through and past each other.

9. A machine for assembling two sets of strips formed with edge notches and having slits communicating with the notches, said machine having means for causing the strips of one set to travel side by side with their notches uppermost, means for depositing the strips of the other set crosswise and inverted on the first set while said first set is travelling, means for collapsing the strips to flatwise relationship, and means for shifting the strips relatively edgewise to cause their slitted portions to interengage.

10. A machine of the character described having independent hoppers and feeders for two sets of cut strips, means for causing one set of strips to travel side by side, and means for interengaging the other set of strips therewith while travelling.

11. A machine of the character described having independent hoppers and feeders for two sets of cut strips, means for causing the strips of one set to travel side by side, means for depositing the strips of the other set thereon while travelling, and means for relatively adjusting the strips to bring the longitudinal edges of both sets of strips into uniform planes.

12. In a machine of the character described, a pair of strip feeders mounted to deliver two strips toward each other, a pair of channels for receiving said strips, means for causing the strips to travel along said channels, and means for delivering a plurality of other strips onto and crosswise of the two strips in the channels.

13. In a machine of the character described a pair of strip feeders mounted to deliver two strips toward each other, a pair of channels for receiving said strips, means for causing the strips to travel along said channels, and a third strip feed mechanism extending into the space between said channels.

14. In a machine of the character described a pair of parallel conveyors, means for supplying a pair of strips to said conveyors upright and side by side and at longitudinally spaced intervals, and means for depositing a plurality of other strips onto and crosswise of each of said pair.

15. In a machine of the character described a pair of parallel conveyors one of which is longer than the other, means for supplying a pair of strips to said conveyors upright and side by side and at longitudinally spaced intervals, means for depositing a plurality of other strips onto and crosswise of each of said pair, and means for laterally collapsing the entire set of strips after passing the shorter one of the two conveyors.

16. In a machine of the character described a pair of parallel conveyors one of which is longer than the other, means for supplying a pair of strips to said conveyors upright and side by side and at longitudinally spaced intervals, means for depositing a plurality of other strips onto and crosswise of each of said pair, means for laterally collapsing the entire set of strips after passing the shorter one of the two conveyors, and means for exerting edgewise pressure on said set of strips.

17. In a machine of the character described, a pair of parallel strip guides, chains having lugs for pushing strips along said guides, means for assembling other strips with and crosswise of those pushed along by said lugs, and means for shifting the relative positions of all of said strips to bring their flat surfaces into juxtaposition.

18. In a machine of the character described, a pair of parallel strip guides, chains having lugs for pushing strips along said guides, means for assembling other strips with and crosswise of those pushed along by said lugs, and means for shifting the relative positions of all of said strips to bring their flat surfaces into juxtaposition, said means including a fixed member in the path of one of the longitudinally moving strips.

19. In a machine of the character described a pair of parallel strip conveyors of different lengths, means for assembling other strips with and crosswise of those moved by said conveyors, and a fixed member beyond the end of the shorter conveyor and in the path of the strip advanced toward it thereby to cause that strip to swing back and carry the crossing strips with it.

20. In a machine of the character described a pair of parallel strip guides, a chain adjacent each guide and having strip-engaging lugs, one of said guides and its cooperating chain being longer than the other, the shorter chain having its lugs at single spaced intervals and the longer chain having its lugs in pairs at similar spaced intervals, means for assembling other strips with and crosswise of those moved by the chain lugs, and a fixed member in the path of each strip advanced by the shorter chain to cause that strip to swing back to present its rear end in front of the rear lug of a pair carried by the longer chain.

21. In a machine of the character described, means for assembling strips in crosswise relationship while travelling, a support for the lower edges of the assembled strips, and a laterally inclined guideway on said support to direct the strips into collapsed condition while travelling.

22. In a machine of the character described, means for assembling strips in edgewise crossing relationship, means for laterally collapsing the assemblage, and a hammer for acting edgewise on the assemblage.

23. In a machine of the character described, means for assembling strips in edgewise crossing relationship, means for laterally collapsing the assemblage, a support and means for maintaining the assemblage upright thereon, and a hammer for acting on the upper edges of the assemblage.

24. In a machine of the character described, means for assembling strips in edgewise crossing relationship, means for laterally collapsing assemblages successively, a pusher mounted to act against the side of each assemblage on the table, and means for preventing return of each assemblage after it is acted upon by the pusher.

25. In a machine of the character described, means for assembling strips in edgewise crossing relationship, means for laterally collapsing each assemblage, a table for receiving collapsed assemblages successively, a hammer for acting edgewise on each collapsed assemblage, means for causing the assemblages to travel under the hammer, a stop for arresting each assemblage on the table, a pusher for acting laterally on each assemblage after passing the hammer, and a catch for preventing return of each assemblage from the position to which it is shifted by the pusher.

In testimony whereof we have affixed our signatures.

LEON E. LA BOMBARD.
MELVIN H. SIDEBOTHAM.